Patented Mar. 20, 1945

2,372,159

UNITED STATES PATENT OFFICE 2,372,159

STABILIZED EMULSIONS

Lessel Lavan Manchey, Mount Vernon, and George H. Schneller, Corona, N. Y., assignors to Vick Chemical Company, New York, N. Y., a corporation of Delaware No Drawing. Application March 9, 1942,
Serial No. 433,868

12 Claims. (Cl. 167—91)

This invention relates to emulsions and suspensions and more particularly to stabilized emulsions of lipophilic materials and to suspensions of water-insoluble materials in aqueous liquids and in which an emulsifying or stabilizing agent dispersed in the aqueous phase may serve as an antiseptic, germicidal or fungicidal agent.

For many purposes, particularly in the pharmaceutical and cosmetic fields, it is desirable to combine an oil or other water-immiscible substance (referred to generally herein by the technical term "lipophilic," which includes, among others, lipids, hydrocarbon oils, organic solvents, sulfur and various natural and synthetic oils, waxes and resins) with water or other substances which are not normally miscible therewith. Thus various emulsions and suspensions, including creams, lotions, pastes, ointments, etc., may be made with an aqueous vehicle in which a desired emollient or medicament or various combinations of them can be dissolved or dispersed in the aqueous phase or dissolved in the lipophilic substance before it is dispersed in the aqueous phase. Our invention is particularly applicable to such compositions in that it makes available as emulsifying and stabilizing agents combinations of harmless, substantially non-toxic substances, which may also have strong antiseptic properties.

It has also been shown recently that oils applied in thin films to walls, floors and furnishings of a sick room, operating room or dressing station, as well as to clothing and bed clothing used by infected persons or by doctors, nurses and others working in the presence of infection, will serve to hold germs and spores from circulating in the air. For this purpose it is desirable that the oil should be thinned to a consistency which can be thinly applied and with a vehicle which can be easily evaporated. Water is an ideal vehicle for this purpose. Our invention is well suited for this purpose in that it provides stable emulsions with control of viscosity and that both the aqueous emulsion and the oil film itself after evaporation of the water are antiseptic so as to destroy germs which are retained on the treated surfaces.

Accordingly, it is an object of our invention to provide aqueous base emulsions and suspensions of oils and other lipophilic substances which can be readily and inexpensively prepared and which will be stable over long periods of time.

Another object of our invention is to provide such emulsions and suspensions which are antiseptic both in the aqueous phase and, in the lipophilic phase after evaporation of the water.

Another object of our invention is to provide such emulsions and suspensions in which the viscosity and surface tension are suitably controlled so as to permit application of a film of desired thickness by spreading out over the surface on which it is applied.

Another object of the invention is to provide pharmaceutical, including cosmetic, emulsions and suspensions of superior stability which are free from toxic and other objectionable emulsifying and stabilizing agents.

Other objects and advantages of our invention will be apparent from the following description and specification.

Although in this specification we are setting forth and describing in detail a preferred embodiment of our invention and various modifications thereof, it should be understood that these are not intended to be exhaustive nor limiting of the invention, but on the contrary are intended to instruct others in the principles of the invention and the manner of applying the same in practical use, so that they may be enabled to modify and vary the formulas given and to select in each case a manner of application of the invention which may be best suited to the conditions of a contemplated use.

It has been known prior to our invention that in general the so-called "-onium" compounds (quaternary ammonium compounds, sulphonium compounds, phosphonium compounds, etc.) of the type having a hydrophilic anion and a lipophilic higher molecular group attached to the nitrogen or other -onium element are in general possessed in some degree of antiseptic value and likewise in some degree of emulsifying activity. Certain of these compounds (e. g., as set forth in copending applications of Robert S. Shelton, Serial No. 222,448, filed August 1, 1938 which has issued as Patent No. 2,295,504 and Serial No. 287,956, filed August 2, 1939 and Serial No. 287,959, filed August 2, 1939 which has issued as Patent No. 2,295,505) having a high molecular aliphatic group of between 14 and 18 carbon atoms and especially a cetyl group and a low molecular weight anion are among the most potent antiseptics known and are also efficient emulsifying agents. It had also been noticed that propyl amine pectate exhibits certain interesting emulsifying and foam producing properties.

We have now discovered that lipophilic materials which are normally immiscible with water, such as lipids, hydrocarbon oils, essential oils, esters, chlorinated solvents, resins, sulphur, organic sulphur compounds, such as carbon disulphide, and various mixtures of these and related substances can be more effectively and more permanently dispersed in water and aqueous liquids by use of a combination of pectin and a cation-active emulsifying agent, especially an -onium or amine salt. In this combination pectin should be principally in the form of pectinic acid partially neutralized but preferably still substantially acid. The higher the pH the more rapid will be the degradation of the pectinic acid. We have found that even the presence of strong organic bases has a deleterious effect upon the pectin, tending to degrade it and to give a low viscosity mixture. For this reason we prefer to use, not the free bases, but their salts. These may be employed in relatively small fractions of a chemical equivalent of the amount of pectin used. The salts suitable for the present invention are those which have a hydrophilic anion (particularly salts of the lower molecular weight acids) and which have in the cation portion of the molecule a lipophilic group, which may be an aliphatic radical having from 8 to 18 carbon atoms, although the molecule may include one or more carbocyclic or heterocyclic groups.

This combination of pectin and an organic emulsifying salt gives results which are substantially beyond the sum of any results which could be expected from the individual behavior of pectin and the organic salt. With such a combination we have found not only a surprisingly high viscosity for the aqueous phase but also a surprisingly effective emulsifying activity and surprising stability of the thus prepared emulsions and suspensions against creaming and settling and centrifugal separation; and, with these desirable properties, we find that antiseptic value of the -onion or amine compounds can be taken advantage of and that a wide latitude in the proportions of the aqueous and lipophilic phases of the emulsions or suspensions may be permitted and that a wide variety of other ingredients may be mixed with the aqueous or the lipophilic phase.

The action of the pectin in this combination appears to be unique. It cannot be replaced by other stabilizing or viscosity-producing agents such as agar, acacia, tragacanth, karaya, starch or gelatine or by various high molecular weight organic acids other than pectin.

The action of the -onion or amine salt on the other hand appears to be typical of the broad class of cation-active emulsifying substances having higher molecular lipophilic groups and to vary roughly as the direct emulsifying power of these compounds varies within the class. This correlation of the direct emulsifying power of the compound alone is not, however, complete. We have found, for example, an anomalously high stability in the emulsions made with pectin and cetyl trimethyl ammonium salts or stearyl trimethyl ammonium salts or cetyl beta acetoxy ethyl dimethyl ammonium salts, as compared with other compounds of the same class; and we have found likewise an anomalously high viscosity in such emulsions made with pectin and cetyl trimethyl ammonium salts, stearyl trimethyl ammonium salts or cetyl beta acetoxy ethyl dimethyl ammonium salts. The bromides have been found desirable for such use in all of the above compounds. Fortunately, we have found that the compounds showing the best activity for purposes of our invention are among the best compounds from a germicidal standpoint as set forth in said prior applications of Robert S. Shelton.

Other examples of ammonium and amine salts which we have used successfully with pectin for production of highly stable emulsions of desirable viscosity include:

Myristyl trimethyl ammonium bromide
Lauryl trimethyl ammonium bromide
Cetyl tri-n-butyl ammonium bromide
Cetyl benzyl dimethyl ammonium bromide
Cetyl pyridinium bromide
Cetyl methyl piperidinium bromide
Cetyl methyl morpholinium bromide
$\beta,\beta'$, Di (cetyl dimethyl ammonium) ethyl ether dinitrate
$p$-Xylene di (cetyl dimethyl ammonium) dibromide
Lauryl amine hydrochloride
Lauryl dimethyl amine hydrochloride
Cetyl dimethyl amine hydrochloride The pectin and the organic emulsifying salt of the type specified should, of course, be soluble in the aqueous phase to the extent required for forming and stabilizing the emulsion; and, particularly in the case of antiseptic emulsions wherein such organic salt acts as the antiseptic substance, to the extent desired for antiseptic activity. The proportions of the substances used will, of course, vary to some extent depending upon the purpose in view, the particular compounds used and the particular ingredients of the emulsion. In general, however, we have found suitable an amount of pectin approximating 1% of the aqueous phase and an amount of the organic emulsifying salt (especially quaternary ammonium salt having one higher molecular aliphatic group attached to the ammonium nitrogen) which is equal to approximately .15 to .6 chemical equivalents of the pectin used, and advantageously .2 or less. Thus, for example, using a pectin of equivalent weight 400 and cetyl trimethyl ammonium bromide, the equivalent weight of which is 364, the cetyl trimethyl ammonium bromide, for best results, should be in proportion less than 0.546 part by weight and more than 0.136 part by weight, to one part of pectin; or using pectin of equivalent weight 920 the cetyl trimethyl ammonium bromide should be less than 0.237 and more than 0.057 part by weight for each part of pectin used.

With increasing amounts of the salt of the organic base the viscosity and the stability of the emulsion will in general increase up to a maximum and then will drop off again with eventual curdling if too great amounts of the organic salt is present in the solution.

The pectin is first dispersed in an aqueous solution containing the organic salt. This may be by known technique, but we have found at this stage that it is advantageous to use a finely divided pectin and to mix it intimately with a material which insulates the particles of pectin from one another and allows the water to penetrate into the mass and separate the particles without masses of the particles becoming lumped and stuck together. For this purpose, we have found it is satisfactory to soak the pectin in alcohol or advantageously to mix the finely divided pectin with powdered boric acid. The boric acid and the alcohol probably act physically to hold the particles of pectin apart until the water can enter fully between them.

We have found that the pectin suitable for this purpose should be a partially degraded, i. e., partially depolymerized and partially demethoxylated, pectin of the type having an equivalent weight within the range of approximately 400 to 920, which when washed ash-free in the form of 1% aqueous solution possesses a pH of approximately 2.6 to 2.8. Desirably it should be substantially free from calcium and other alkaline earth metal.

In general the procedure by which the lipophilic substances, such as oils, fats, waxes and the like, of the types enumerated may be dispersed through the aqueous phase is represented essentially by the following example:

Pectin is mixed with cetyl trimethyl ammonium bromide previously dissolved in distilled water until completely dispersed. The oil or premelted fat or wax, etc., or lipophilic solution, is then run in slowly with vigorous stirring, by which we mean agitation of any kind, and such stirring is continued until the resulting mixture is uniform. It is advantageous to viscolize or homogenize the preparation in any manner as is commonly done in treatment of emulsions.

By appropriate selection of the oil, fat or wax, etc., or by varying the amounts of pectin and cetyl trimethyl ammonium bromide, any degree of consistency between that of a thin lotion and that of a heavy ointment may be obtained at will. In practice, the concentration of oil in the emulsion may be varied within very wide limits with satisfactory results. For example, an aqueous phase consisting of 10 parts of pectin and 1.6 parts of cetyl trimethyl ammonium bromide dispersed in 858 parts of distilled water may be used to emulsify the oil in any proportions between one part by weight of oil with ninety-nine parts of aqueous phase, and sixty parts of oil with forty parts of aqueous phase. Such emulsions withstand centrifugation under conditions producing a centrifugal force as high as 1980 times that of gravity for two hours without the separation of a visible amount of free oil. Emulsions containing the lower oil concentrations show some creaming, and emulsions containing oil concentrations higher than 60 parts per 40 parts of aqueous phase undergo separation of a small portion of the oil under the stated conditions of centrifugation. Such separation may be prevented by increasing the concentrations of the pectin and of the cetyl trimethyl ammonium bromide in the aqueous phase. Emulsions exhibit increasing viscosity after homogenization as the oil concentration is increased and the viscosity may be increased further by raising the concentration of pectin and of cetyl trimethyl ammonium bromide. This augmentation of viscosity may be extended to the condition of semisolid plasticity.

It is an advantage of the invention that it permits the inclusion of a wide variety of therapeutic, cosmetic, flavoring and/or perfuming agents, which may be either soluble or insoluble in the aqueous and oil phases. Such modifications in the procedure outlined peculiar to the physical characteristics of the materials employed will be understood by those familiar with pharmaceutical procedures. Thus, many combinations of medicinal and cosmetic value may be obtained.

The following specific formulas will illustrate practical uses for the invention:

1. *Lotion for treatment and prevention of various forms of dermatitis and for routine treatment of infants after bathing*

| | Parts |
|---|---|
| Mineral oil | 120.0 |
| Boric acid | 20.0 |
| Anhydrous lanolin | 10.0 |
| Pectin | 10.0 |
| Cetyl trimethyl ammonium bromide | 1.6 |
| Perfume oil | 0.1 |
| Distilled water | 838.0 |

2. *Liniment*

| | | |
|---|---|---|
| Pectin | gm | 8.0 |
| Cetyl trimethyl ammonium bromide | gm | 1.6 |
| Oil of turpentine | cc | 250.0 |
| Distilled water | cc | 750.0 |

3. *Disinfectant emulsion*

| | | |
|---|---|---|
| Pectin | gm | 8.0 |
| Cetyl trimethyl ammonium bromide | gm | 1.6 |
| Oil of pine | gm | 12.0 |
| Chlorphenyl phenol | gm | 12.0 |
| Distilled water | cc | 750.0 |

4. *Therapeutic ointment*

| | | |
|---|---|---|
| Pectin | gm | 25.0 |
| Cetyl trimethyl ammonium bromide | gm | 5.0 |
| Balsam of Peru | gm | 120.0 |
| Glycerin | gm | 50.0 |
| Castor oil | gm | 370.0 |
| Distilled water | cc | 430.0 |

5. *Vapor inhalant*

| | | |
|---|---|---|
| Pectin | gm | 8.0 |
| Cetyl trimethyl ammonium bromide | gm | 1.6 |
| Camphor | gm | 100.0 |
| Menthol | gm | 100.0 |
| Distilled water | cc | 792.0 |

6. *Hair dressing*

| | | |
|---|---|---|
| Pectin | gm | 10.0 |
| Cetyl trimethyl ammonium bromide | gm | 1.6 |
| Castor oil | gm | 100.0 |
| Glycerin | gm | 50.0 |
| Perfume | cc | 0.2 |
| Distilled water | cc | 840.0 |

7. *Sulfur lotion*

| | | |
|---|---|---|
| Pectin | gm | 8.0 |
| Cetyl trimethyl ammonium bromide | gm | 1.6 |
| Precipitated sulfur | gm | 100.0 |
| Distilled water | cc | 890.0 |

The composition of the first formula given above, when used on the skin, is found to act as an antiseptic and germicidal emollient useful in the prevention and treatment of various forms of dermatitis and skin infection (not due to dietetic causes) and for prevention and control of infections resulting from superficial injuries. Thus, in the clinical use of this lotion on infants in maternity hospitals there has been in all cases a significant reduction, and in most cases a substantial elimination, of skin irritation such as impetigo, chapping, chafing, intertrigo, excoriated buttocks (urine scald, diaper rash, etc.), prickly heat, cradle cap, scaly scalp, etc. This composition is also an effective agent for cleansing sensitive skin, ears, nose, abrasions, etc., too sensitive for use of soap. The same material used as a hand and face lotion on adults has proven effective against inflammations such as chafing, chapping, cracking, peeling, prickly heat, sunburn and windburn. As compared with the direct use of unemulsified oils these compositions have the great advantage of being readily applied in thinner films which avoid waste of the material and oil-staining of clothes and towels. Because of their perfect emulsion in the aqueous phase, these compositions can be readily applied to the skin, or other surfaces immediately after washing. Likewise, the presence of the emulsifying agent with the oil after the water has evaporated makes it much easier to wash away, even from the pores and crevices of the skin and thus aids in keeping the skin in clean healthy condition.

The invention can be used, as indicated by the above examples, to disperse an oil or lipophilic ingredient of any kind which may be the essential active ingredient, or it may be used for adding to an aqueous composition a minor lipophilic ingredient such, for example, as essential oils which serve as flavoring or perfuming constituents. One of the great advantages of our present invention is that the emulsions thus formed are highly stable against dilution, and thus emulsions of such essential oils may be used as additions in various aqueous compositions, e. g., for flavorings to be used in cookery. Likewise, certain lipophilic substances which are not readily compounded with one another may be separately emulsified and entirely blended by mixing such emulsions. Thus waxes and resins can be readily blended with oil.

The sulfur dispersion of Example 7 may be used as given or may be used for adding sulfur to various aqueous compositions. Instead of using dry powdery sulfur as set forth in this example, one may dissolve it in a suitable solvent and disperse the solution like any other lipophilic substances in accordance with the invention.

Anaesthetics can by this same technique be conveniently added to lotions or ointments for use on painful or itching irritations. Cod liver oil and other medicinal oils and lipophilic substances can be emulsified and dispersed in water as a "milk" or "cream" much easier to take than heavy oily substances themselves. The pectin in this case, being edible, is entirely unobjectionable in a composition to be taken internally, whereas, the emulsifying organic salt, if suitably chosen, may be entirely non-toxic and unobjectionable in the concentrations required.

In general, we may use for purposes of our invention any of the cation active emulsifying agents (i. e., having a high molecular weight chain or other lipophilic group in the cation portion of the molecule, in contrast to the "wetting agents" of the type represented, for example, by sodium lauryl sulphoacetate, alkyl aryl sodium sulphonate and other anion-active "wetting agents") which are not so alkaline in reaction as to cause degradation of the pectin. Within this group of cation-active emulsifying agents, the -onium compounds and particularly the quaternary ammonium compounds have proven to be most effective and efficient.

We shall use the term "pharmaceutical" herein broadly to include protective and preventative antiseptic emulsions as well as cosmetic and therapeutic compositions.

What we claim is:

1. A stable emulsion or dispersion of a lipophilic substance in an aqueous phase which comprises pectin and a cetyl quaternary ammonium compound emulsifying agent, the anion portion of which is a hydrophilic acid constituent, the amount of pectin being in excess of the chemical equivalent of the quaternary ammonium compound.

2. A stable emulsion or dispersion of a lipophilic substance in an aqueous phase which comprises pectin and a cetyl trimethyl ammonium compound, the anion portion thereof being a hydrophilic acid constituent, the amount of quaternary ammonium compound being about 0.15 to 0.6 times the chemical equivalent of the pectin.

3. A stable emulsion or dispersion of a lipophilic substance in an aqueous phase which comprises pectin and a stearyl quaternary ammonium compound, the anion portion of which is a hydrophilic acid constituent, the amount of pectin being in excess of the chemical equivalent of the quaternary ammonium compound.

4. A skin lotion which comprises an emollient substance in stable emulsion in an aqueous phase comprising pectin of the type consisting principally of pectinic acid partially neutralized but still acid, and a germicidal quaternary ammonium emulsifying agent of the type having a higher molecular weight aliphatic radical in the cation portion of the molecule and having a hydrophilic acid constituent as the anion portion thereof, the amount of pectin being in excess of the chemical equivalent of the quaternary ammonium compound.

5. A pharmaceutical composition which comprises about 1% to about 65% of an emollient oil dispersed in an aqueous liquid containing about 1% of pectin substantially free from alkaline earth metals and partially neutralized but still acid, and about 0.2% of cetyl trimethyl ammonium bromide, the amount of quaternary ammonium compound being about 0.15 to 0.6 times the chemical equivalent of the pectin.

6. A skin lotion which comprises an oil dispersed in an aqueous solution of pectin, boric acid and cetyl trimethyl ammonium bromide, the amount of quaternary ammonium compound being about 0.15 to 0.6 times the chemical equivalent of the pectin.

7. A stable emulsion or dispersion of a lipophilic substance in an aqueous phase which includes a cation-active emulsifying agent selected from the class consisting of amines and quaternary ammonium compounds having a high molecular lipophilic aliphatic group attached to the nitrogen and pectin of the type consisting principally of pectinic acid partially neutralized but still acid, the amount of pectin being in excess of the chemical equivalent of the cation-active emulsifying agent.

8. A stable emulsion of oil in an aqueous phase comprising pectin of the type consisting principally of pectinic acid partially neutralized but still acid, and a quaternary ammonium compound having a 12 to 18 carbon atom aliphatic radical in the cation portion of the molecule and the anion portion thereof being hydrophilic acid constituent, the amount of pectin being in excess of the chemical equivalent of the quaternary ammonium compound.

9. The method of making a water emulsion of lipophilic substance which comprises mixing finely divided pectin with an insulating agent, stirring the resulting mixture with an aqueous solution of a cation-active emulsifying agent selected from the class consisting of amines and quaternary ammonium compounds having a high molecular lipophilic group attached to the nitrogen until the pectin is uniformly dispersed, stirring the lipophilic substance into the resulting aqueous phase and homogenizing the resulting dispersion.

10. A stable emulsion or dispersion of a lipophilic substance in an aqueous phase which includes a cation-active emulsifying agent selected from the class consisting of amines and quaternary ammonium compounds having a high molecular lipophilic group attached to the nitrogen and partially degraded pectin principally in the form of pectinic acid partially neutralized but still acid in reaction, and substantially free from alkaline earth metal, the amount of pectin being in excess of the chemical equivalent of the cation-active emulsifying agent.

11. An emulsifying and stabilizing agent which comprises in combination, partially degraded pectin principally in the form of pectinic acid, substantially free from alkaline earth metal, partially neutralized but still acid in reaction, and a cation-active emulsifying agent selected from the class consisting of amines and quaternary ammonium compounds having a high molecular lipophilic group attached to the nitrogen, the amount of pectin being in excess of the chemical equivalent of the cation-active emulsifying agent.

12. A stable emulsion or dispersion of a lipophilic substance in an aqueous phase which includes pectin of the type which consists principally of pectinic acid partially neutralized but still acid and substantially free from alkaline earth metals and a cation-active emulsifying agent selected from the class consisting of amines and quaternary ammonium compounds having a high molecular lipophilic group attached to the nitrogen, the amount of pectin being in excess of the chemical equivalent of the cation-active emulsifying agent.

L. LAVAN MANCHEY.
GEORGE H. SCHNELLER.